UNITED STATES PATENT OFFICE.

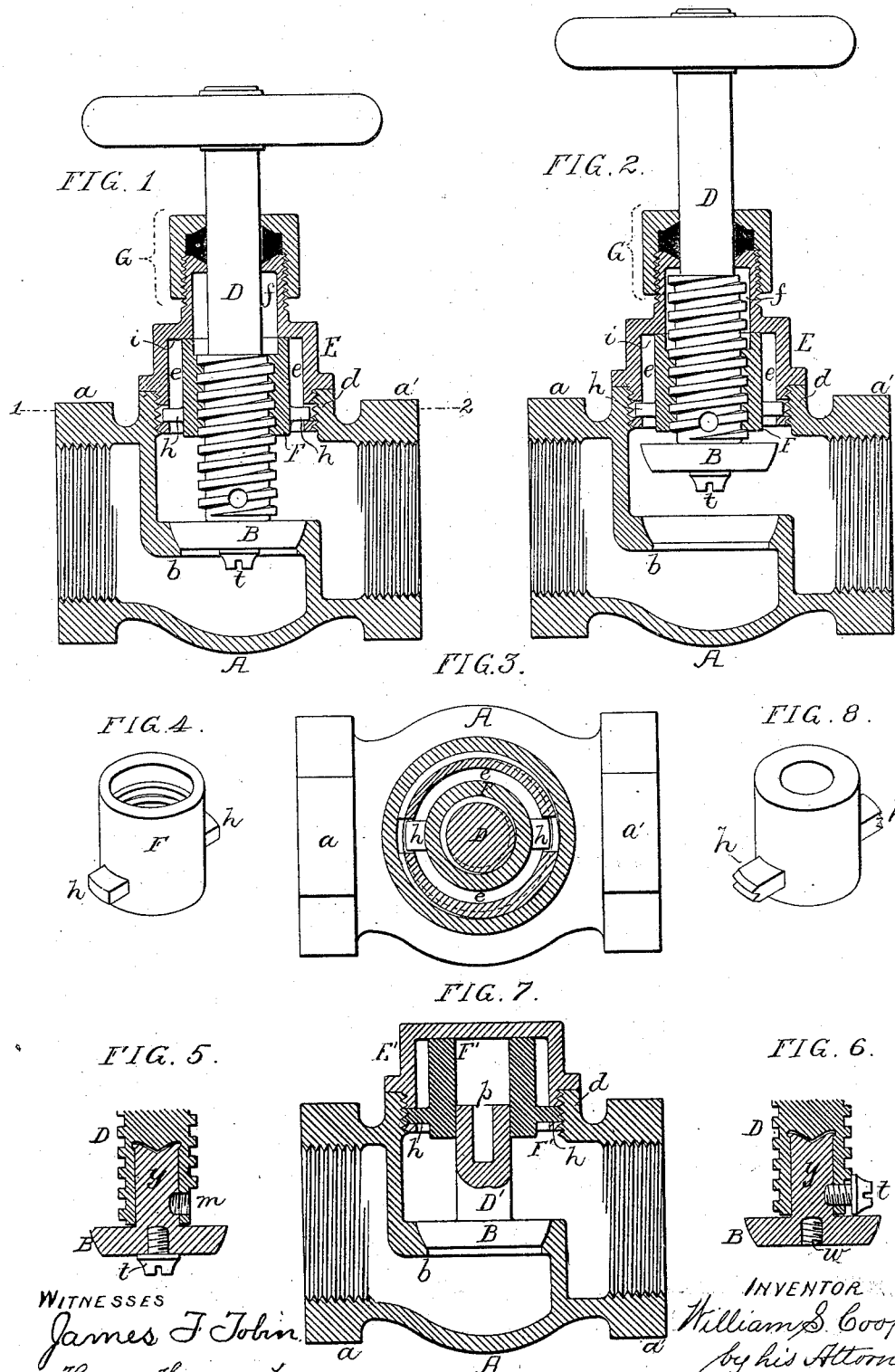

WILLIAM S. COOPER, OF PHILADELPHIA, PENNSYLVANIA.

STOP AND CHECK VALVE.

SPECIFICATION forming part of Letters Patent No. 232,941, dated October 5, 1880.

Application filed August 16, 1880. (No model.)

*To all whom it may concern:*

Be it known that I, WILLIAM S. COOPER, a citizen of the United States, residing in Philadelphia, Pennsylvania, have invented certain Improvements in Stop and Check Valves, of which the following is a specification.

The object of my invention is to afford facilities for regrinding the valves proper of stop and check valves to their seats, and in the case of stop-valves to insure the durability of the threaded portion of the valve-spindle and its nut, as fully explained hereinafter.

In the accompanying drawings, Figures 1 and 2 are vertical sections of a stop-valve provided with my improvement, and showing the valve proper in different positions; Fig. 3, a sectional plan on the line 1 2; Fig. 4, a perspective view of the nut of the threaded valve-spindle; Figs. 5 and 6, sectional views of the valve and part of the valve-spindle, illustrating one of the features of my invention; Fig. 7, a sectional view, showing my improvement applied to a check-valve, and Fig. 8 a perspective view of part of the check-valve.

In Figs. 1, 2, 3, 4, 5, and 6, A is the valve-chest, having the usual branches $a$ $a$ for receiving the ends of the pipes, there being within the chest the ordinary partition $b$, having an opening, on the edge of which is formed the seat for the valve B, which is connected to the threaded spindle D in the manner shown in Figs. 5 and 6.

The chest A has a third branch, $d$, into which is screwed the casing or cap E, having a chamber, $e$, for receiving the nut F, and an upper chamber, $f$, into which the threaded portion of the valve-spindle can pass freely, as shown in Fig. 2, the casing being surmounted with a stuffing-box, G, adapted to the plain portion of the valve-spindle D.

The nut F has opposite lugs $h$ $h$, as shown in Fig. 4, which fit freely into slots made in that portion of the casing which screws into the branch $d$ of the chest, these lugs being either plain at the ends and free from the internal screw-thread in the said branch $d$, or threads may be cut on the ends of the lugs, as shown in Fig. 8, so as to correspond with the said internal screw-thread of the branch $d$.

A shoulder, $i$, is formed within the casing E, and this shoulder resists the upward thrust on the nut F on tightening the valve to its seat, the lugs $h$ $h$ being sufficiently loose in the slots to be relieved from this thrust.

In many valves of the class to which my invention relates a comparatively small portion of the threaded part of the valve-spindle is within the limit of the nut when the valve is on its seat, and this is objectionable, as there are few convolutions of the thread to resist the strain, and this must result in the unequal wearing of the screw-thread.

The chamber $f$ in the casing E admits the threaded portion of the spindle, as shown in Fig. 2; hence that portion may be of such a length that when the valve is on its seat, as in Fig. 1, nearly the whole of the nut will contain convolutions of the thread of the spindle.

When the valve has to be reground to its seat the nut F is removed, and a small screw, $t$, is introduced into a threaded opening in the valve-spindle, its point entering a recess in a cylindrical projection, $y$, on the valve, so as to secure the latter to the said spindle, after which the spindle and valve may be manipulated in the manner usually adopted in regrinding valves to their seats.

In order that there may always be a proper screw, $t$, at hand, I form in the under side of the valve a threaded recess, $w$, which may be occupied by the threaded stem of the screw, as in Fig. 5, at all times, excepting when it is required for securing the valve to the valve-spindle.

When my invention is applied to a check-valve, as shown in Fig. 7, a threadless guide, F', takes the place of the nut F, the plain spindle D', which forms part of the valve B, being arranged to slide in this guide, which is contained in the casing or cap E', the latter being screwed into the branch $d$ of the valve-chest. In this modification the lugs $h$ $h$ of the guide may be threaded, as shown in Fig. 8, so that when the valve has to be reground to its seat the cap E' may be detached and the guide screwed into the threaded interior of the chest and used as a centering medium, while, by a suitable instrument introduced into an orifice, $p$, of the valve-spindle, the valve may be operated in the usual manner adopted in reseating.

I claim as my invention—

1. The combination, in a stop or check valve, of a nut or guide adapted to the valve-spindle, and having lugs h h, with a casing or cap detachably secured to the valve-chest, forming a chamber for receiving the guide, and having slots adapted to the said lugs, all substantially as set forth.

2. The combination, in a stop-valve, of the threaded valve-spindle D and nut F with the detachable casing E, containing a chamber, e, for receiving the nut which is connected to the casing, and a chamber, f, for receiving the threaded portion of the spindle, all substantially as set forth.

3. The combination, in a stop-valve, of the threaded spindle having a threaded orifice, m, for receiving a screw, w, with a valve, B, having a projection, y, and a threaded orifice, n, for receiving the said screw, as described.

4. The combination, in a check-valve, of the internally-threaded branch d of the valve-chest, the cap or casing E', and the valve-spindle guide F', having lugs provided with screw-threads adapted to the said internal thread of the branch d, all substantially as specified.

In testimony whereof I have signed my name to this specification in the presence of two subscribing witnesses.

WILLIAM S. COOPER.

Witnesses:
H. R. SHULTZ,
HENRY HOWSON, Jr.